US010943465B1

(12) United States Patent
Le et al.

(10) Patent No.: US 10,943,465 B1
(45) Date of Patent: Mar. 9, 2021

(54) DEVICE NOTIFICATION AND AGGREGATION

(71) Applicant: Amazon Technologies, Inc., Seattle, WA (US)

(72) Inventors: Vuong Van Le, Seattle, WA (US); Ohil Krishnamurthy Manyam, Bellevue, WA (US); Michel Leonard Goldstein, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 305 days.

(21) Appl. No.: 15/472,162

(22) Filed: Mar. 28, 2017

(51) Int. Cl.
G08B 29/04 (2006.01)
H04N 7/18 (2006.01)
H04N 17/00 (2006.01)
G06Q 10/08 (2012.01)

(52) U.S. Cl.
CPC ........... G08B 29/04 (2013.01); G06Q 10/087 (2013.01); H04N 7/183 (2013.01); H04N 17/002 (2013.01)

(58) Field of Classification Search
CPC .............................. H04N 7/183; H04N 17/002
USPC .......................................................... 348/143
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 2003/0002712 | A1 | 1/2003 | Steenburgh et al. |
| 2004/0181467 | A1 | 9/2004 | Raiyani et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0121017 | A1 | 5/2009 | Cato et al. |
| 2009/0245573 | A1 | 10/2009 | Saptharishi et al. |
| 2011/0011936 | A1 | 1/2011 | Morandi et al. |
| 2011/0212717 | A1* | 9/2011 | Rhoads .............. G06K 9/00664 455/420 |
| 2012/0284132 | A1 | 11/2012 | Kim et al. |
| 2013/0076898 | A1 | 3/2013 | Philippe et al. |
| 2013/0117078 | A1* | 5/2013 | Weik, III ............... G06Q 10/00 705/13 |
| 2013/0253700 | A1 | 9/2013 | Carson et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

Primary Examiner — Nasser M Goodarzi
Assistant Examiner — Jaycee Imperial
(74) Attorney, Agent, or Firm — Athorus, PLLC

(57) ABSTRACT

Described is a device notification aggregation service ("DNAS") that aggregates device state information, such as alarms, from multiple distributed devices and then provides device state information and/or device set status information to services that rely on data from the distributed devices to make decisions on other events.

18 Claims, 10 Drawing Sheets

(56) References Cited

U.S. PATENT DOCUMENTS

| | | | |
|---|---|---|---|
| 2014/0047143 A1* | 2/2014 | Bateman | H04N 7/181 |
| | | | 710/72 |
| 2014/0279294 A1 | 9/2014 | Field-Darragh et al. | |
| 2014/0362223 A1 | 12/2014 | LaCroix et al. | |
| 2015/0019391 A1 | 1/2015 | Kumar et al. | |
| 2015/0041616 A1* | 2/2015 | Gentile | G06Q 10/087 |
| | | | 248/550 |
| 2015/0073907 A1 | 3/2015 | Purves et al. | |
| 2017/0359555 A1* | 12/2017 | Irani | G07C 9/00309 |
| 2018/0091381 A1* | 3/2018 | McLaughlin | H04W 12/0017 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

DEVICE NOTIFICATION AND AGGREGATION

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

DETAILED DESCRIPTION

Figure 1:
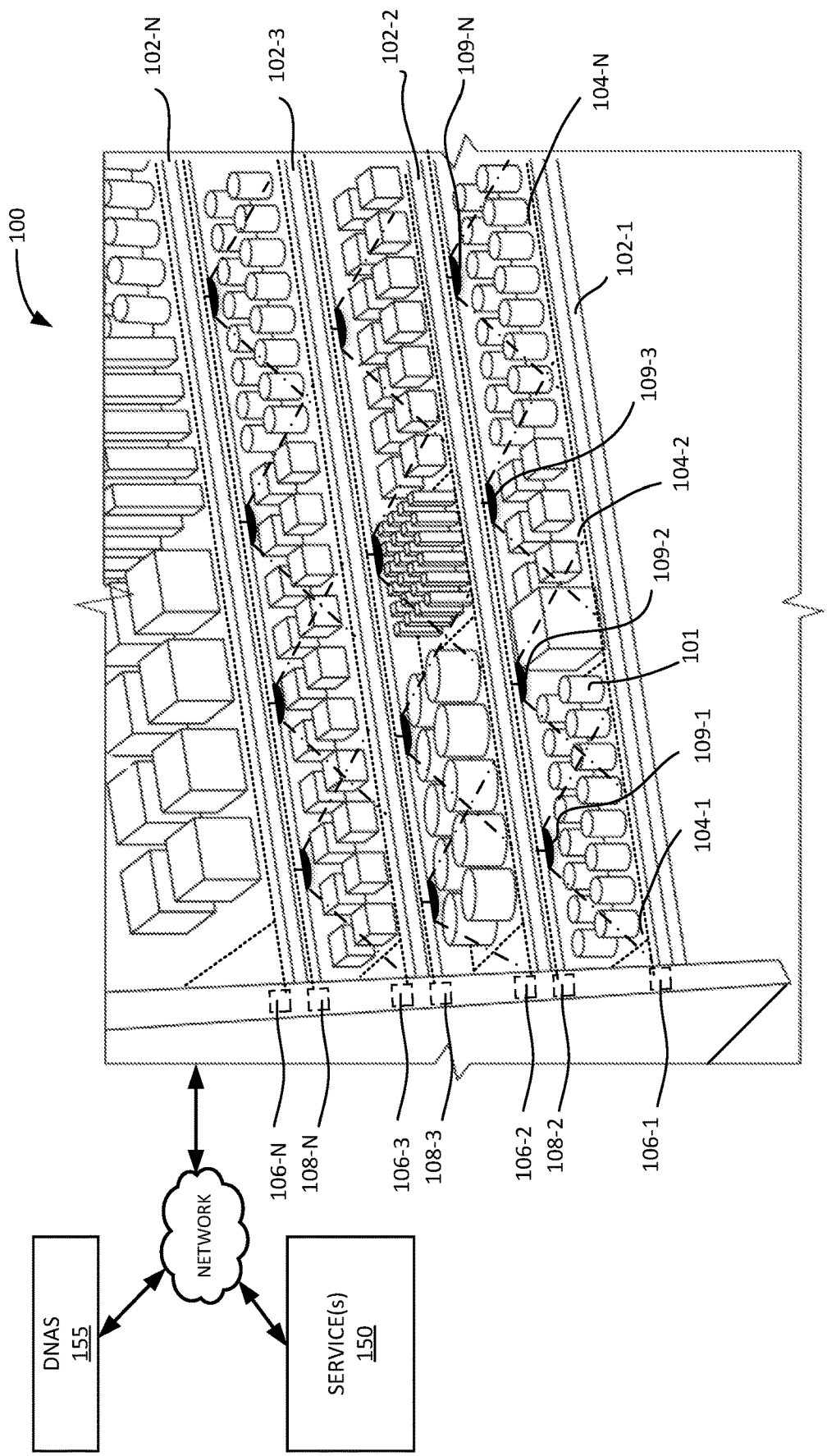
FIG. 1 is a block diagram of an inventory area, in accordance with described implementations.

This disclosure describes a device notification aggregation service ("DNAS") that aggregates device state information, such as alarms, from multiple distributed devices and then provides device state information and/or device set status information to services that rely on data from the distributed devices to make decisions on other events. For example, an inventory shelf may include one or more imaging elements, such as in-shelf cameras, that are oriented to obtain images of items on the inventory shelf. Those imaging elements may be controlled by and provide device data to a first processing component. Likewise, one or more weight sensors, such as scales, may be included on or in the inventory shelf to detect changes in weight of items on the inventory shelf. The one or more weight sensors may by controlled by and provide device data to a second processing component that is independent of the first processing component.

While the imaging elements and the weight sensors may be independently controlled, device data from those devices may be utilized by different services to determine events at the materials handling facility and/or at the inventory shelf. The DNAS, as described herein, maintains state information for each of the distributed devices within a materials handling facility and provides device state information and/or device set status information to the different services, as needed, so that those services can accurately determine from received device data an event that occurred.

For example, if all devices of a device set are operating normally, the DNAS may provide a first device set status notification indicating that all devices of the device set are operating as expected and that data received from the devices of the device set during a timeframe is reliable. If one or more of the devices are not operating as expected, for example, one of the devices has reported an alarm and/or has not provided an update within an expected timeframe, the DNAS may provide a second device set status indicating that one or more devices of the device set is not operating as expected. Such an indication may be utilized by a service to determine whether to discount or ignore device data received from the device that is in an alarm state. The second device set status may also indicate the device(s) that is in an alarm state. Finally, if more than a threshold number of devices of a device set are in an alarm state, the DNAS may provide a third device set status indicating that data from devices of the device set is unreliable. The third device set status may also indicate the devices of the device set that are in an alarm state.

An "alarm state" as used herein refers to a state of any device the is not operating as expected, is not operating, has generated and alarm and/or other notification. A "device set," as used herein, is a set of one or more devices that are logically related and data from which is utilized by one or more services. A device set may include one or more devices of the same or different types. A device may be associated with one or more device sets. Likewise, a service may request device data from multiple different device sets for the same or different purposes. Each time device data is requested and/or received by a service from one or more devices, the service will request or receive from the DNAS device set status for the device set used by the service that includes the device. The service and/or the DNAS will determine the device set that includes all devices relied upon by the service that includes the device for which device state was requested. The DNAS will then provide to the service a device set status for the device set and/or provide device state information for each device of the device set or each device of the set that is in the alarm state.

A service, upon receiving the device set status and/or the device state for devices of the device set, may utilize that information in event determination. For example, if the service is an inventory management service that utilizes device data from an in-shelf camera and a weight sensor on the shelf to determine an event (e.g., item pick or item place), the service will utilize received device set status information and/or device state information to determine what device data to consider when determining the event at an inventory shelf.

As an illustrative example, FIG. 1 is a block diagram of an inventory area 100 within a materials handling facility, in accordance with described implementations. In the illustrated example, the inventory area includes inventory shelves 102-1, 102-2, 102-3 . . . 102-N. Each inventory shelf 102 may contain one or more inventory items 101. Likewise, one or more devices may be incorporated on or in the inventory area that generate device data that is used by one or more services 150, such as an inventory management service to determine events occurring at the inventory area. For example, the inventory area 100 may include one or more in-shelf cameras 109 that are positioned on the underneath side of an inventory shelf 102 and oriented such that items on an adjacent lower shelf are within a field of view of the in-shelf camera. For example, the second inventory shelf 102-2 may include in-shelf cameras 109-1, 109-2, 109-3 . . . 109-N, each of which are positioned on the underneath side of the second inventory shelf 102-2 and oriented such that one or more inventory items 101 positioned on the adjacent first inventory shelf 102-1 are within the field of view of a least one of the in-shelf cameras 109-1, 109-2, 109-3 . . . 109-N. Likewise, in some implementations, the field of view of the in-shelf cameras may overlap so that all items positioned on the adjacent inventory shelf are within the field of view of at least one in-shelf camera 109 of the adjacent shelf. As discussed further below, the in-shelf cameras may be any form of camera including, but not limited to, digital video cameras, digital still cameras, stereoscopic cameras, etc.

The in-shelf cameras 109-1, 109-2, 109-3 . . . 109-N positioned on the underneath side of the second inventory shelf 102-2 may be provide device data to and be controlled by a first processing unit 108-2. As illustrated in FIG. 1, each inventory shelf, expect for the first inventory shelf 102-1 may include in-shelf cameras positioned on the underneath side of the shelf and oriented to obtain images of items positioned on adjacent and lower inventory shelf. In some implementations, in-shelf cameras of each inventory shelf may provide device data to different processing components. For example, in-shelf cameras of the second inventory shelf may provide device data to the processing component 108-2, in-shelf cameras of the third inventory shelf 102-3 may provide device data to the processing component 108-3, and the in-shelf cameras of the N-th inventory shelf may provide device data to processing component 108-N. In other implementations, all in-shelf cameras may provide device data to a single in-shelf camera processing component.

In addition to the in-shelf cameras 109, the inventory area 100 may include one or more weight sensors 104 positioned on or in the inventory shelves 102. For example, the first inventory shelf 102-1 may include weight sensors 104-1, 104-2 . . . 104-N positioned on or in the self to detect changes in weight at the shelf, for example, from items being picked from the shelf and/or placed onto the shelf. As discussed further below, the weight sensors may be any variety of sensors to measure a change in a weight at the inventory shelf. Likewise, while this example illustrates multiple weight sensors 104-1, 104-2 . . . 104-N on the first inventory shelf, in some implementations, a single weight sensor may be positioned on each inventory shelf.

The weight sensors 104 of the first inventory shelf 102-1 may provide device data to and be controlled by processing component 106-1, which may be distinct and independent from the processing component(s) 108 used to control the in-shelf cameras. Likewise, each shelf may include one or more weight sensors and the weight sensors of different inventory shelves may provide device data to and be controlled by different processing components. For example, weight sensors of the second inventory shelf 102-2 may provide device data to and be controlled by processing component 106-2, weight sensors on the third inventory shelf 102-3 may provide data to and be controlled by processing component 106-3, and the weight sensors on the N-th inventory shelf may be controlled by and provide device data to processing component 106-N. Like the in-shelf cameras, in some implementations the weight sensors may provide device data to and be controlled by different processing components of the inventory area 100. In other implementations, the weight sensors of the inventory area may provide device data to and be controlled by a single processing component 106 of the inventory areas.

In addition to providing device data, each device may directly and/or indirectly provide state notifications to the DNAS 155. In some implementations, the DNAS periodically receives from each of the devices and/or the processing components, device state information indicating a state of each device. In some implementations, each device 104, 109, may be configured to periodically provide to the DNAS a device state notification indicating the state of the device. If the device is operating properly, the device will send a first notification (e.g., heartbeat) indicating that it is operating as expected. If the device begins to operate improperly, it may send a second device state, referred to herein as an alarm state, indicating that the device is experiencing problems. If the device does not send any device state information for a period of time, such failure to provide any device state information may be an indication that the device is not operating properly and placed in an alarm state.

The DNAS 155 receives, aggregates and stores device state information for each device within the materials handling facility. The DNAS 155 may also determine if the state of any device has changed. For example, each device state notification may include a timestamp indicating a time at which the device state was generated by the device. The DNAS receives the device state information and corresponding timestamp, and compares the device state with the device state for the immediately prior timestamp to determine if the state of the device has changed.

If the device state of a device has changed, the DNAS 155 may determine device sets associated with the device. As discussed below, for each device set with which the device is associated, a device set status may be maintained. For example, if the device is the only device in the device set that is not operating as expected, the device set status may have a second status, referred to herein as a grey status. A "grey status" of a device set, as used herein, indicates that data from at least one device of the device set may be unreliable and/or that at least one device of the device set is in an alarm state. In comparison, if multiple devices of a device set are in an alarm state, the device set status may be set to a third status, referred to herein as a "black status." A black status for a device set status may indicate that insufficient data from the device set is available for a service to determine an event from the device data. In comparison, if all devices are operating as expected (i.e., in a normal state), a first device set status, referred to herein as a "white status," is provided for the device set. A white status indicates that all devices are operating as expected.

In one example, if item 101 is picked from the first inventory shelf by an agent, the inventory management service will receive device data from at least one of the weight sensor 104-1 and/or the in-shelf camera 109-2. The inventory management service utilizes the data from the two logically related devices to determine the event that occurred. For example, if the weight sensor data indicates a decrease in weight and the in-shelf camera data indicates a removal of an item, as determined from a processing of images obtained by the in-shelf camera, the inventory management service can determine with a high degree of confidence that an event of an item pick from the first inventory shelf has occurred.

However, if one of the weight sensor 104-1 or the in-shelf camera 109-2 is in an alarm state and the inventory management service is not aware of the alarm state of the device, the inventory management service may not accurately determine the event. For example, if the in-shelf camera 109-2 is in an alarm state and the inventory management service only receives from the weight sensor 104-2 an indication in a change of weight, the inventory management service may not determine an event of an item pick. For example, the inventory management service may incorrectly consider both the change in weight data received from the weight sensor 104-2 and the no change in data from the in-shelf camera 109-2 and not have a high confidence that an event occurred and therefore not register the event. For example, the change in weight could be resultant from other movements in the area and a comparison of both the change in weight data and an indication that nothing has changed from the perspective of the in-shelf camera, because no change data or other device data was received from the in-shelf camera, may result in a determination that no event occurred.

However, with the described implementations, the inventory management service, upon receiving device data from the weight sensor 104-2 may request from the DNAS 155 device state for the weight sensor and/or other devices of the device set relied upon by the inventory management service to determine the event. The DNAS, in response to receiving the request, determines the state of each device within the device set and provides device state information back to the inventory management service for each device and/or provides a device set status to the inventory management service. Continuing with the above example in which the in-shelf camera is in an alarm state, the DNAS, upon receiving the device state request from the inventory management service for the weight sensor and/or a request for the device state of each device in the device set relied upon by the inventory management service to determine an event, will determine that the weight sensor 104-1 is operating as expected but the in-shelf camera 109-2 is in an alarm state, and provide a notification to the inventory management service that the device set status is in a grey state. The DNAS may also provide an indication that the in-shelf camera is in an alarm state and/or an indication that the weight sensor is in a normal state.

The inventory management service, upon receiving the device set status and/or device state information for devices of the device set, will consider the device data received from the devices of the device set differently. For example, rather than incorrectly determining that no event occurred, the inventory management service may not consider the in-shelf camera and come to a low confidence determination that an event of an item pick may have occurred at the inventory location. In instances in which a low confidence event has been determined, the inventory management service may request confirmation from another service, such as an agent. For example, the inventory management service may send information to a human agent and request that the human agent confirm whether the low confidence event of an item pick occurred.

Because the different services utilize different algorithms that are based on device data from the disparate devices of a device set, it is important for the services to know the device state of the different devices and/or the device set status. As another example, if the inventory management service utilizes device data from an in-shelf camera, a weight sensor on the shelf, and a camera positioned on an adjacent inventory area that is across the aisle to determine an event at the inventory area, it is important for the service to know the state of each of those devices during the relevant timeframe of the event. For example, if the weight sensor is not operating, the service needs to be aware of the state of the weight sensor so that the algorithm can be adjusted accordingly.

For example, if the in-shelf camera detects a change at the inventory shelf but no weight change is received from the weight sensor, the algorithm may produce a result that no event has occurred, determining that the change from the in-shelf camera was a result of light variation between frames obtained by the camera. In comparison, if the service has received an indication from the DNAS that the weight sensor is not operating, the algorithm will be adjusted to not consider the non-change from the weight sensor and may conclude that an event may have occurred—such a determination being a low confidence determination.

As another example, if the inventory management service receives an indication from the DNAS that the device set status for a shelf is in a black status (e.g., both the in-shelf camera and the weight sensor are in an alarm state), the inventory management service may take other actions with respect to the inventory shelf. For example, the inventory management service may send a request to an agent monitoring service to determine if an agent is near the inventory shelf. If no agent is near the inventory shelf, then the inventory management service can determine that no event (pick or place) has occurred. As another example, the inventory management service may send a request to an agent or other operator alerting them to the alarm state of the devices and request remedial actions be taken to place the devices in a normal state (e.g., resolve, repair, or replace the devices).

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. An event time and an event location may be determined from any one or more outputs within the materials handling facility. For example, if an agent picks an item from an inventory location or places an item at an inventory location, one or more sensors (e.g., load cells, radio frequency identification (RFID) readers, scanners, visual identification readers) may provide an indication of a detected change representative of the event, a time, and a location. An agent, as used herein, includes any human or robotic device that may be involved in an event (e.g., item pick from an inventory location, item place at an inventory location) within a materials handling facility.

Figure 2:
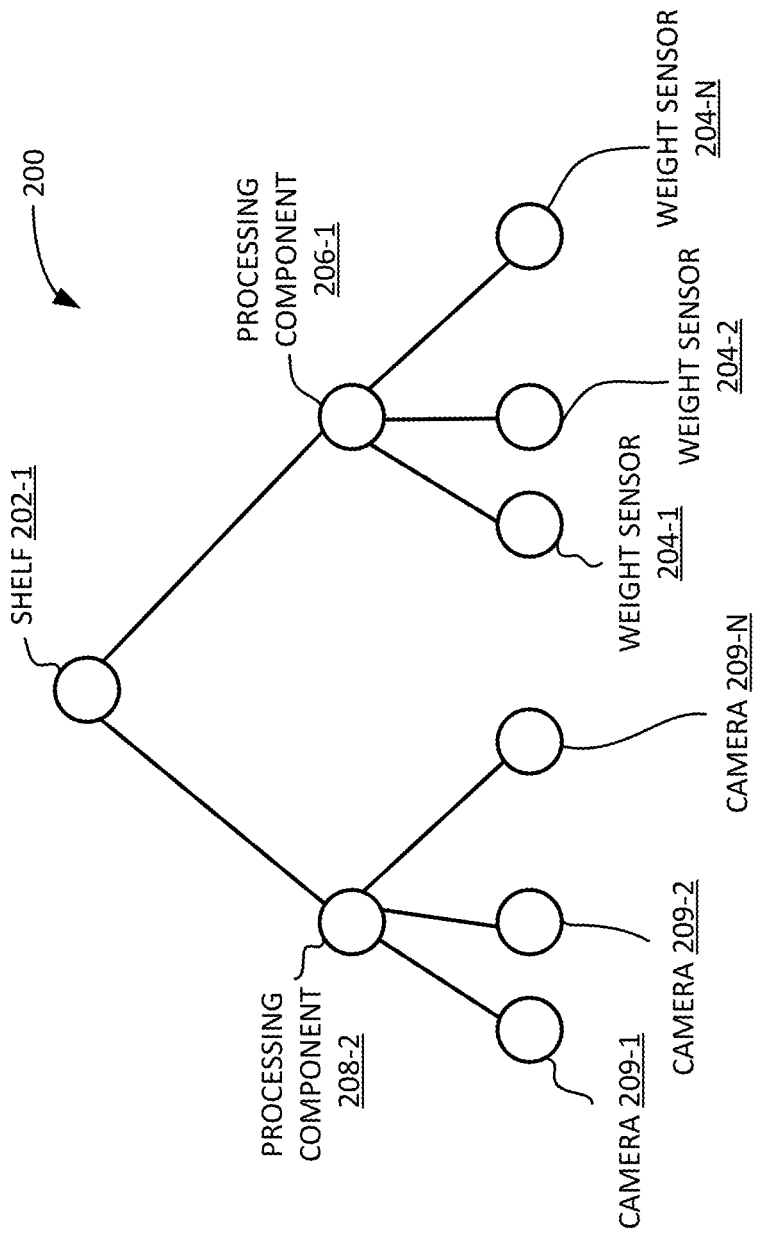
FIG. 2 is a diagram of a logical set of devices at an inventory area, in accordance with described implementations.

FIG. 2 is a diagram of a device set 200 of devices at an inventory area, in accordance with described implementations. The device set 200 corresponds to the devices and processing components used by an inventory management service to determine events occurring on a first inventory shelf 102-1 of the inventory area 100 discussed with respect to FIG. 1. As illustrated in FIG. 1, even though components may be physically positioned on different shelves of an inventory area and/or controlled by different processing components, they may be grouped in a logical set, referred to herein as a device set, that is used by a service, such as an inventory management service, for event determination. In this example, the in-shelf cameras 209-1, 209-2 . . .

209-N, the processing component 208-2 that receives device data from those in-shelf cameras and controls those cameras are part of the device set for the first inventory shelf 202-1 for the inventory management service. Likewise, the weight sensors 204-1, 204-2 . . . 204-N and the processing component 206-1 that receives data from those weight sensors and controls those weight sensors are also part of the device set for the first inventory shelf 202-1.

As discussed below, if a service, such as the inventory management service, requests device set status or device state for devices of the device set 200, the DNAS will query device state information for each device during a relevant timeframe and provide the device state for each device and/or the device set status for the set to the requesting service for the requested timeframe. As described herein, a timeframe refers to any specified period of time or time duration. Additional examples of timeframes are discussed further below with respect to FIG. 8.

While the device set 200 illustrates a device set for the inventory management service, it will be appreciated that any variety of device sets may be maintained by the DNAS for different devices and/or different services. Likewise, as discussed further below, a timestamp for each device state may also be received with the device state and stored in a data store by the DNAS. As such, when a service requests device state and/or device set status information it may be for a specific period of time (timeframe) and the DNAS may query the data store to obtain relevant device state information for the requested timeframe.

Likewise, because the system is distributed, the order in which device state information is received by the DNAS for different devices may vary. As such, the DNAS may receive a device state indicating an alarm for a device at a point in time. the DNAS may then query the data store to determine device sets potentially affected by the alarm state of the device and provide a notification to any services that utilize information for that device state during the relevant timeframe. For example, if a service requested device state information for devices of a first device set for a first timeframe, the DNAS will provide device set status and/or device state for each device for the first timeframe. If the DNAS then, later, receives a device state from one of the devices indicating that the device state for that device during the first timeframe is different, the DNAS may provide an update to the service indicating the changed understanding of the device state for one or more of the devices in the device set for the first timeframe.

Figure 3:
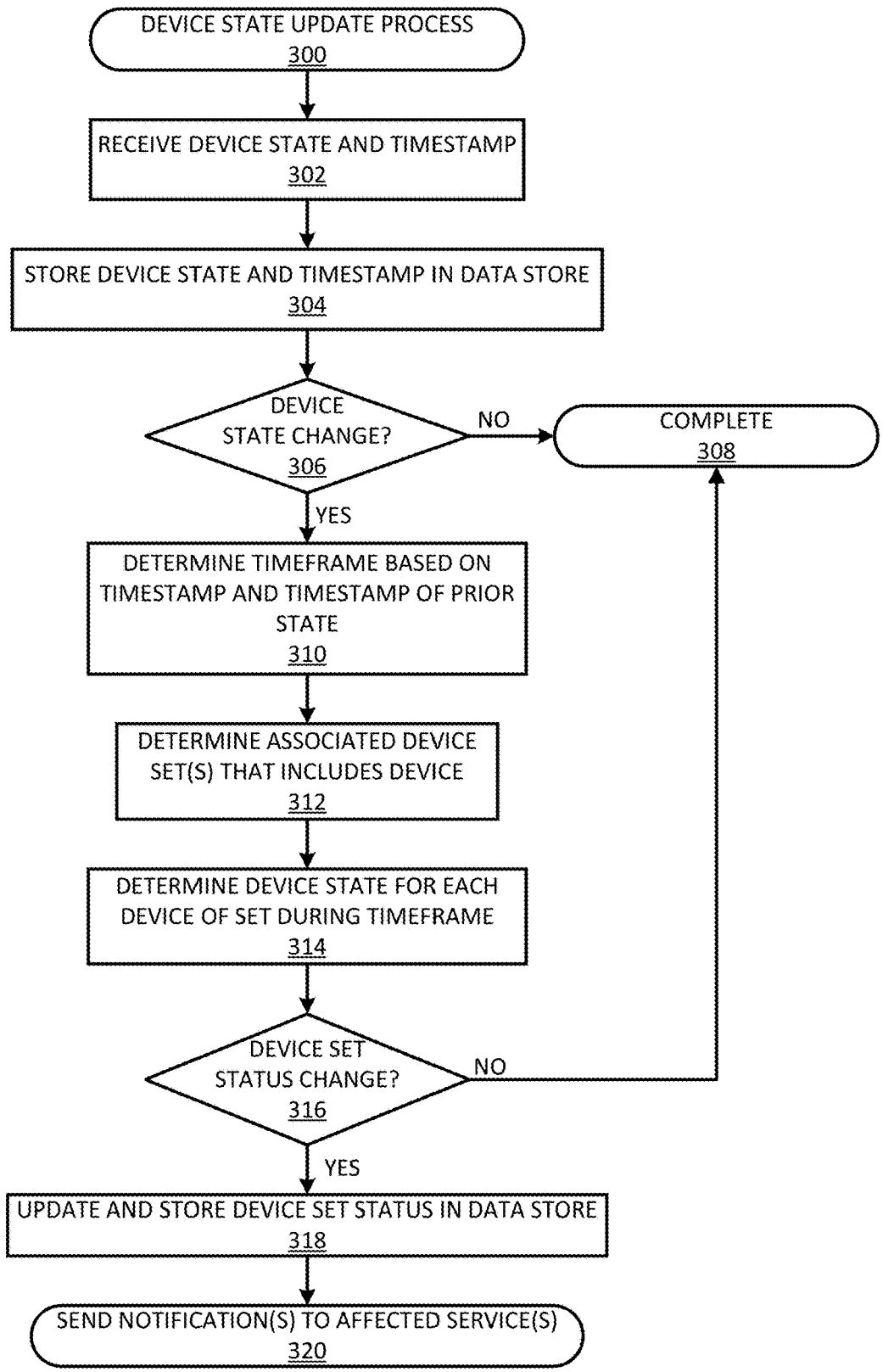
FIG. 3 is a flow diagram of an example device state update process, in accordance with described implementations.

FIG. 3 is a flow diagram of an example device state update process 300, in accordance with described implementations. The example process 300 begins when a device state and a timestamp is received from a device located within a materials handling facility, as in 302. As discussed above, devices and/or processing components that receive device data and control various devices may periodically provide device state information. For example, devices may be configured to provide device state information on a defined periodic schedule (e.g., every five seconds).

In other implementations, devices may be configured to only provide device state information when a state of the device has changed. Various forms of device state information may be utilized and delivered in a variety of manners. For example, a device state in the form of a heartbeat or periodic transmission from the device that includes a device identifier may be sent by the device. Another form of device state may be an alarm or other notification that the device is not operating as expected. In some instances, if devices are to provide a device state according to a defined periodic schedule, and if the device state information is not received, it may be an indication that the device has changed from a normal state to an alarm state.

As device state information and corresponding timestamps are received, the device state information and timestamp for each device is aggregated and stored in a data store, as in 304. As discussed further below, the DNAS may maintain one or more data stores that include device state information for each device within the materials handling facility. The device state information may also include a corresponding device identifier and timestamp indicating the time at which the device state for the device was determined.

In addition to storing the device state and timestamp, a determination is made as to whether the device state for the device has changed, as in 306. For example, the example process may compare the received device state with a stored device state that is closest in prior time, based on a comparison of the timestamps, to the received device state to determine if the device state for the device has changed. Because device state information may not be received in order, the time stamp information is compared to determine if the device state of the device has changed. For example, the example process 300 may receive device state information from a first device in the following timestamp order: $T_0$, $T_1$, $T_2$, $T_5$, $T_4$, $T_3$. In such an instance, it is important to compare the timestamps to ensure that the device state of the device and whether the device state has changed is properly considered. For example, if the device state at each of times $T_0$, $T_1$, $T_2$, $T_5$, and $T_4$ has a device state of OK and the device state at time $T_3$ is an alarm state, it is important to determine that the device state for the device changed from a normal state to an alarm state between times $T_2$ and $T_3$, not between times $T_4$ and $T_3$, which is the order in which the device state information was received by the example process 300.

If it is determined that the device state between the two closest points in time has not changed, the example process completes, as in 308. However, if it is determined that the device state has changed, a timeframe related to the device state change is determined based on the timestamp of the received device state and the timestamps of stored device state information for the device, as in 310. Referring to the above example, the timeframe for the first device in which the first device was in an alarm state will be times $T_3$ through $T_4$.

For the determined timeframe, the example process 300 also determines other devices included in a device set with the device for which a state change is detected, as in 312. As discussed above, a device may be associated with one or more device sets that are used by one or more services.

For each device of a device set that includes the device for which a device change is detected, the device state during the timeframe is determined, as in 314. For example, if the first device for which a status change has been detected for timeframe $T_3$-$T_4$ is associated with a device set that includes two other devices, the device state for each of those two other devices during timeframe $T_3$-$T_4$ is determined based on the timestamps associated with device state information received by the example process 300 and stored in a data store for those devices.

Based on the device state for each device of the device set during the relevant timeframe, a device set status for that timeframe is updated and stored in the data store, and a determination is made as to whether the device set status has changed, as in 316. For example, if the first device is the only device of the device set that has changed from a normal state to an alarm state, the device set status may be updated from a white state to a grey state. In comparison, if the device set only includes two devices and one of those devices was in an alarm state during the relevant timeframe such that both devices are now determined to be in the alarm state during the timeframe, the device set status may be updated to a black status for the relevant timeframe. If it is determined that the device set status has not changed, the example process completes, as in 308.

However, if it is determined that the device set status has changed, the device set status is updated and stored in a data store, as in 318. In addition, update notifications may be sent to any affected services, as in 320. For example, if a service had requested device state information and/or device set status for the relevant timeframe, or for a timeframe that includes some or all of the relevant timeframe, an update notification may be sent to the service informing the service that the known state of the devices during the timeframe has been updated. For example, if a service had previously requested and received device state information and/or device set status information for a device set that includes the first device before the example process 300 received the device state corresponding to time $T_3$, the example process 300 would have reported that the device state for the device at time $T_3$ was normal. However, upon receiving the device state for the first device at time $T_3$, the example process learns that the device state for the first device and/or the device set status for a device set that includes the first device for any timeframe that includes $T_3$ needs to be updated because the first device is in an alarm state at time $T_3$.

Figure 4:
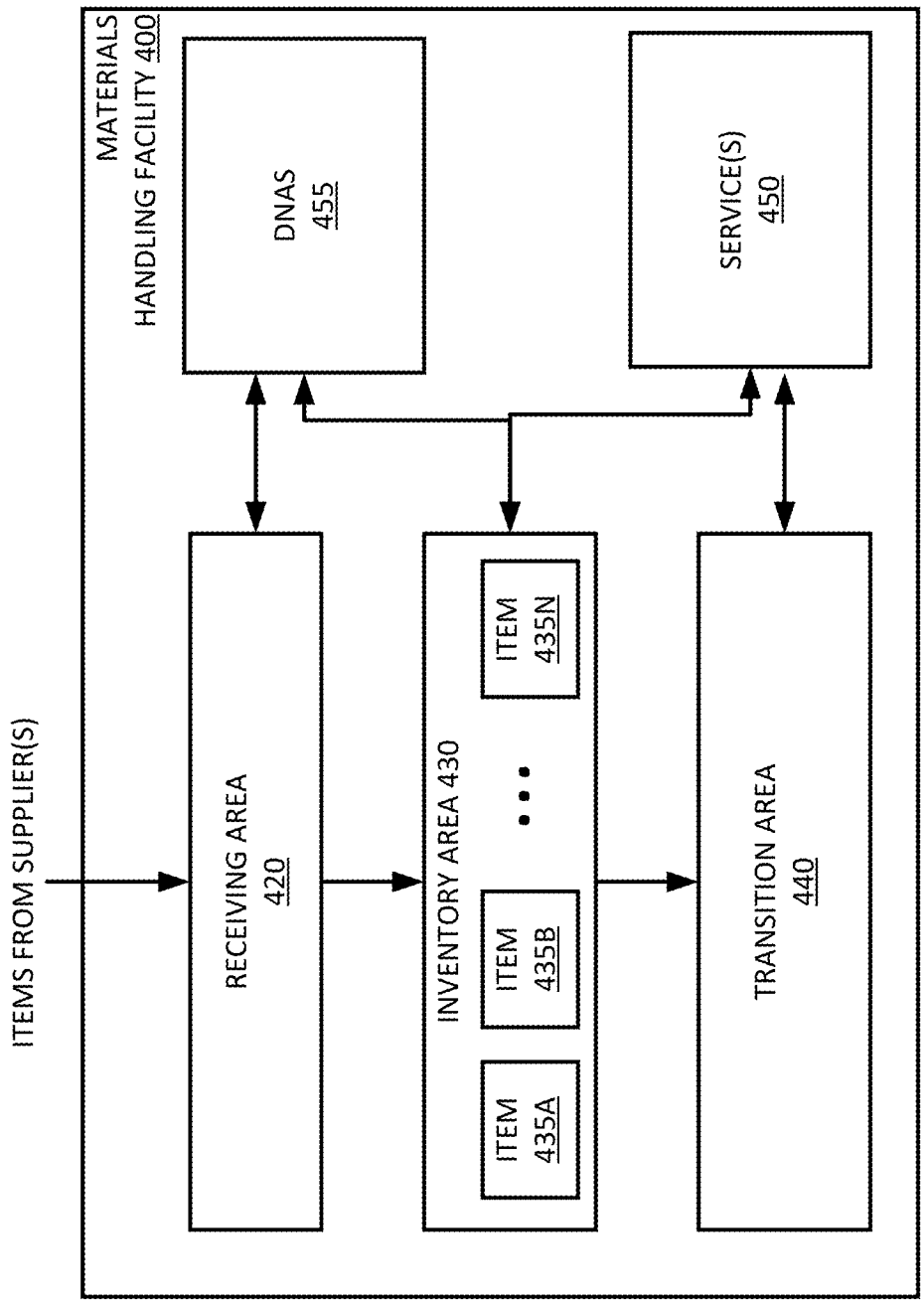
FIG. 4 is a block diagram illustrating a materials handling facility, in accordance with described implementations.

An implementation of a materials handling facility configured to store and manage inventory items is illustrated in FIG. 4. As shown, a materials handling facility 400 includes a receiving area 420, an inventory area 430 configured to store an arbitrary number of inventory items 435A-435N, and one or more transition areas 440. The arrangement of the various areas within materials handling facility 400 is depicted functionally rather than schematically. For example, in some implementations, multiple different receiving areas 420, inventory areas 430 and/or transition areas 440 may be interspersed rather than segregated. Additionally, the materials handling facility 400 includes a DNAS 455 and one or more services 450, such as the inventory management service discussed herein.

The materials handling facility 400 may be configured to receive different kinds of inventory items 435 from various suppliers and to store them until an agent retrieves one or more of the items. The general flow of items through the materials handling facility 400 is indicated using arrows. Specifically, as illustrated in this example, items 435 may be received from one or more suppliers, such as manufacturers, distributors, wholesalers, etc., at receiving area 420. In various implementations, items 435 may include merchandise, commodities, perishables, or any suitable type of item depending on the nature of the enterprise that operates the materials handling facility 400.

Upon being received from a supplier at receiving area 420, items 435 may be prepared for storage. For example, in some implementations, items 435 may be unpacked or otherwise rearranged and the inventory management service (which, as described, may include one or more software applications executing on a computer system) may be updated to reflect the type, quantity, condition, cost, location or any other suitable parameters with respect to newly received items 435. It is noted that items 435 may be stocked, managed or dispensed in terms of countable, individual units or multiples of units, such as packages, cartons, crates, pallets or other suitable aggregations. Alternatively, some items 435, such as bulk products, commodities, etc., may be stored in continuous or arbitrarily divisible amounts that may not be inherently organized into countable units. Such items 435 may be managed in terms of measurable quantities, such as units of length, area, volume, weight, or other dimensional properties characterized by units of measurement. Generally speaking, a quantity of an item 435 may refer to either a countable number of individual or aggregate units of an item 435 or a measurable amount of an item 435, as appropriate.

After arriving through receiving area 420, items 435 may be stored within inventory area 430 on an inventory shelf. In some implementations, like items 435 may be stored or displayed together in bins, on shelves or via other suitable storage mechanisms, such that all items 435 of a given kind are stored in one location. In other implementations, like items 435 may be stored in different locations. For example, to optimize retrieval of certain items 435 having high turnover or velocity within a large physical facility, those items 435 may be stored in several different locations to reduce congestion that might occur at a single point of storage.

When an order specifying one or more items 435 is received, or as an agent progresses through the materials handling facility 400, the corresponding items 435 may be selected or "picked" (an event) from the inventory area 430. For example, in one implementation, an agent may have a list of items to pick and may progress through the materials handling facility picking items 435 from the inventory area 430. In other implementations, an agent may pick items 435 using written or electronic pick lists derived from orders. In some instances, an item may need to be repositioned from one location within the inventory area 430 to another location. For example, in some instances, an item may be picked from its inventory location, moved a distance and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed by another service 450, such as an agent pattern management service to determine an agent pattern representative of the agent and to track a position of the agent as the agent moves. Likewise, in some implementations, descriptors representative of the agent may be periodically determined for the agent from the obtained images as the agent moves about the materials handling facility.

Figure 5:
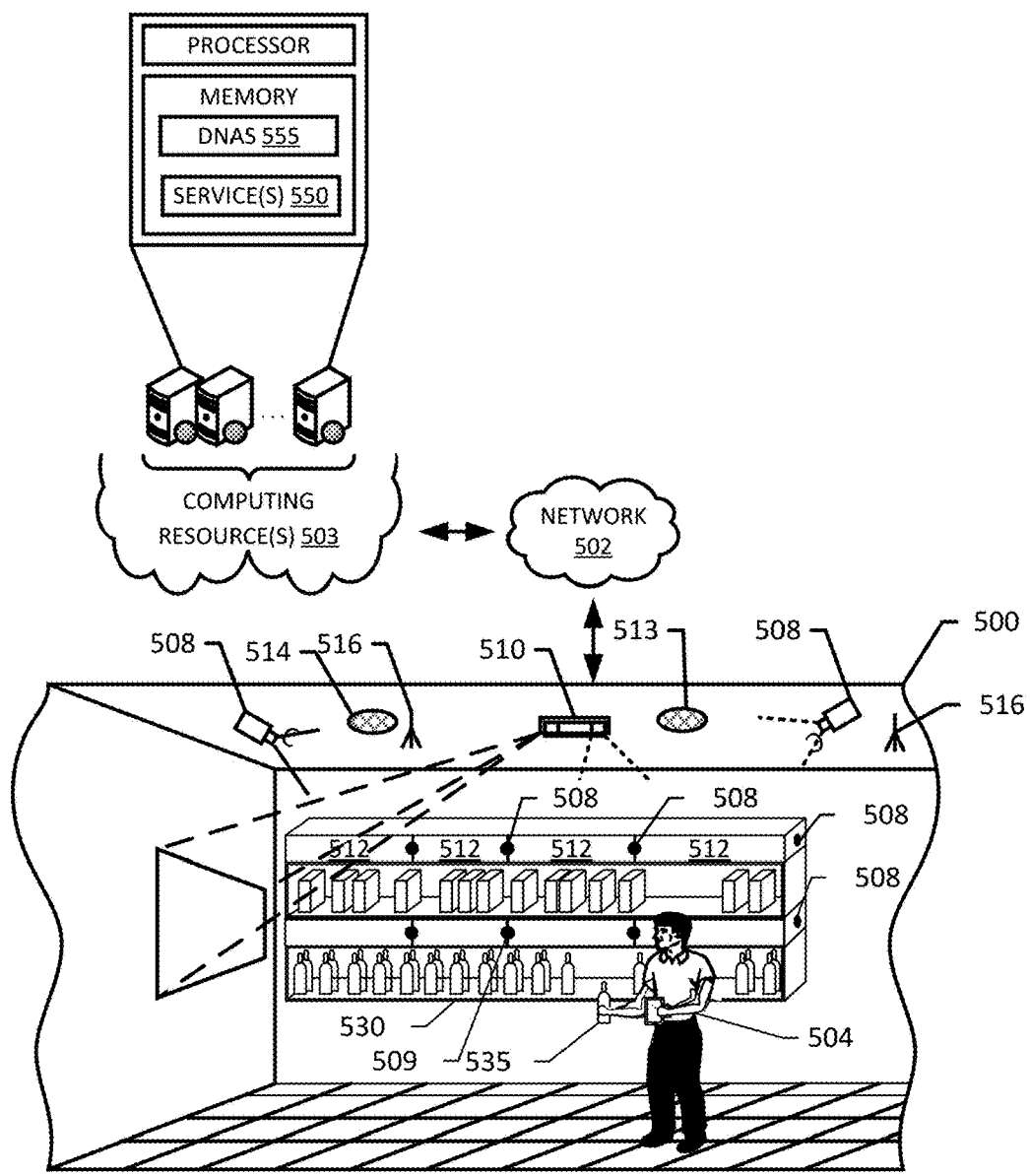
FIG. 5 shows additional components of the materials handling facility of FIG. 4, in accordance with described implementations.

FIG. 5 shows additional components of a materials handling facility 500, according to one implementation. Generally, the materials handling facility 500 may include one or more image capture devices 508, 509, such as cameras. In some implementations, the overhead image capture devices 508 may be positioned overhead, such as on the ceiling, and oriented toward a surface (e.g., floor) of the materials handling facility so that the overhead image capture devices 508 are approximately perpendicular with the surface and the field of view is oriented toward the surface. The overhead image capture devices 508 are used to capture images of agents and/or locations within the materials handling facility from an overhead or top-down view. Likewise, one or more side-view image capture devices 509 may be positioned on, inside, or adjacent to inventory areas and/or otherwise positioned and oriented so that an inventory location is within a field of view of the side-view image capture device 509. For example, a series of side-view image capture devices 509 may be positioned on external portions of inventory areas and oriented to capture images of agents and/or other inventory locations (e.g., those on an opposite side of an aisle). In some implementations, side-view image capture devices 509 may be arranged throughout the materials handling facility such that each inventory location is within a field of view of at least two side-view image capture devices 509. Likewise, as discussed herein, one or more shelves of the inventory location may include in-shelf cameras that are positioned on an interior under-side of a shelf and oriented to obtain images of items on an adjacent lower shelf.

Any type of image capture device and/or configuration of image capture devices may be used with the implementations described herein. For example, one or more of the image capture devices may be a red, green, blue ("RGB") color camera, still camera, motion capture/video camera, etc. In other implementations, one or more of the image capture devices may be depth sensing cameras, also referred to herein as a RGBD camera. For example, the overhead image capture devices 508 may each be depth sensing image capture devices and the side-view image capture devices 509 may be color based (RGB) cameras.

In still other implementations, one or more of the image capture devices may be a thermographic or infrared (IR) camera, etc. In some implementations, the image capture devices may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing and/or other services, such as the inventory management service, discussed herein. In some implementations, image capture devices may be paired to provide stereo imagery and depth values indicating a distance between the paired image capture device and an object being imaged. A stereo camera may include a pair of image capture device modules. Image data may be stored in any variety of formats including, but not limited to, YUYV, RGB, RAW, HEX, HSV, HLS, CMYK, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green, or blue) expressed in the reflected light, and store values associated with the pixel colors as image data and/or transmit image data to another device for further analysis or reproduction. The camera may also be configured to determine depth values, such as the distance between the camera and an object in the field of view of the camera. Depth values may be included in or provided with the image data generated by the camera.

Information and/or data regarding features or objects represented in a digital image may be extracted from the image in any number of ways. For example, a color of a pixel or a group of pixels in image data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, RFID readers, etc., may be utilized with the implementations described herein. For example, as discussed above, a weight sensor, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location.

As discussed, each of the devices, such the cameras, pressure sensors, infrared sensors, light curtains, load cells, RFID readers, etc., may provide state information to the DNAS.

When an agent 504 arrives at the materials handling facility 500, one or more overhead images of the agent 504 may be captured and processed using overhead cameras 508. For example, the images of the agent 504 may be processed to identify the agent. This may be done using a variety of techniques, such as object recognition, pattern matching, etc. In some implementations, rather than or in addition to processing images to identify the agent 504, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc.

The captured images and/or other inputs may also be used to establish an agent pattern for the agent 504 while located in the materials handling facility 500. In various implementations, the agent patterns are determined from the overhead image capture devices 508. As the agent moves, the position and orientation of the agent pattern is updated and is used to track the agent as the agent moves throughout the materials handling facility.

In addition to establishing an agent pattern when the agent first arrives at the materials handling facility and is identified, one or more descriptors representative of the agent or the agent pattern may be determined. For example, one or more descriptor regions may be established, such as a torso region or a head region, and a descriptor representative of the region may be determined, stored in a descriptor data store and associated with the agent or the agent pattern while the agent is located in the materials handling facility. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 5, in some implementations, an agent located in the materials handling facility 500 may possess a portable device and obtain information about items located within the materials handling facility 500, receive confirmation that the inventory management service has correctly identified items that are picked and/or placed by the agent, receive requests for confirmation regarding one or more event aspects, etc. Generally, the portable device has at least a wireless module to facilitate communication with the services 450 (e.g., the inventory management service) and/or the DNAS 455. The portable device may store a unique identifier and provide that unique identifier to one or more of the services 450 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the various services 450 and/or the DNAS 455. Likewise, components of the DNAS 455 and/or the other services 450 may interact and communicate with the portable device as well as identify the agent, communicate with the agent via other means and/or communicate with other components of the services 450 and/or DNAS 455.

Generally, the DNAS 455 and/or the other services 450 may communicate with or include one or more input/output devices, such as imaging devices (e.g., cameras) 508, projectors 510, displays 512, speakers 513, microphones 514, illumination elements (e.g., lights), etc., to facilitate communication between the services 450, DNAS 455, and/or the agent and detection of items, events and/or other actions within the materials handling facility 500. In some implementations, multiple input/output devices may be distributed within the materials handling facility 500. For example, there may be multiple imaging devices, such as cameras located on the ceilings (overhead cameras) and/or cameras (such as pico-cameras) located in the aisles near the inventory items (side-view cameras), and/or in-shelf cameras.

Likewise, the services 450 and/or the DNAS may also communicate with or include one or more communication devices, such as wireless antennas 516, which facilitate wireless communication (e.g., Wi-Fi, Near Field Communication (NFC), Bluetooth) between the services 450 and/or the DNAS 455 and other components or devices. The various services 450 and/or the DNAS may also utilize or include one or more computing resource(s) 503, such as a server system, that may be local to the environment (e.g., materials handling facility), remote from the environment, or any combination thereof.

The services 450 and/or DNAS 455 may utilize antennas 516 within the materials handling facility 500 to create a network 502 (e.g., Wi-Fi) so that the components and devices can connect to and communicate with the services 450 and/or DNAS 455. For example, when the agent picks an item 535 from an inventory area 530, a camera may detect the removal of the item and one or more of the services 450, such as the inventory management service, may receive information, such as image data of the performed event (item pick from the inventory area), identifying that an item has been picked from the inventory area 530

Figure 6:
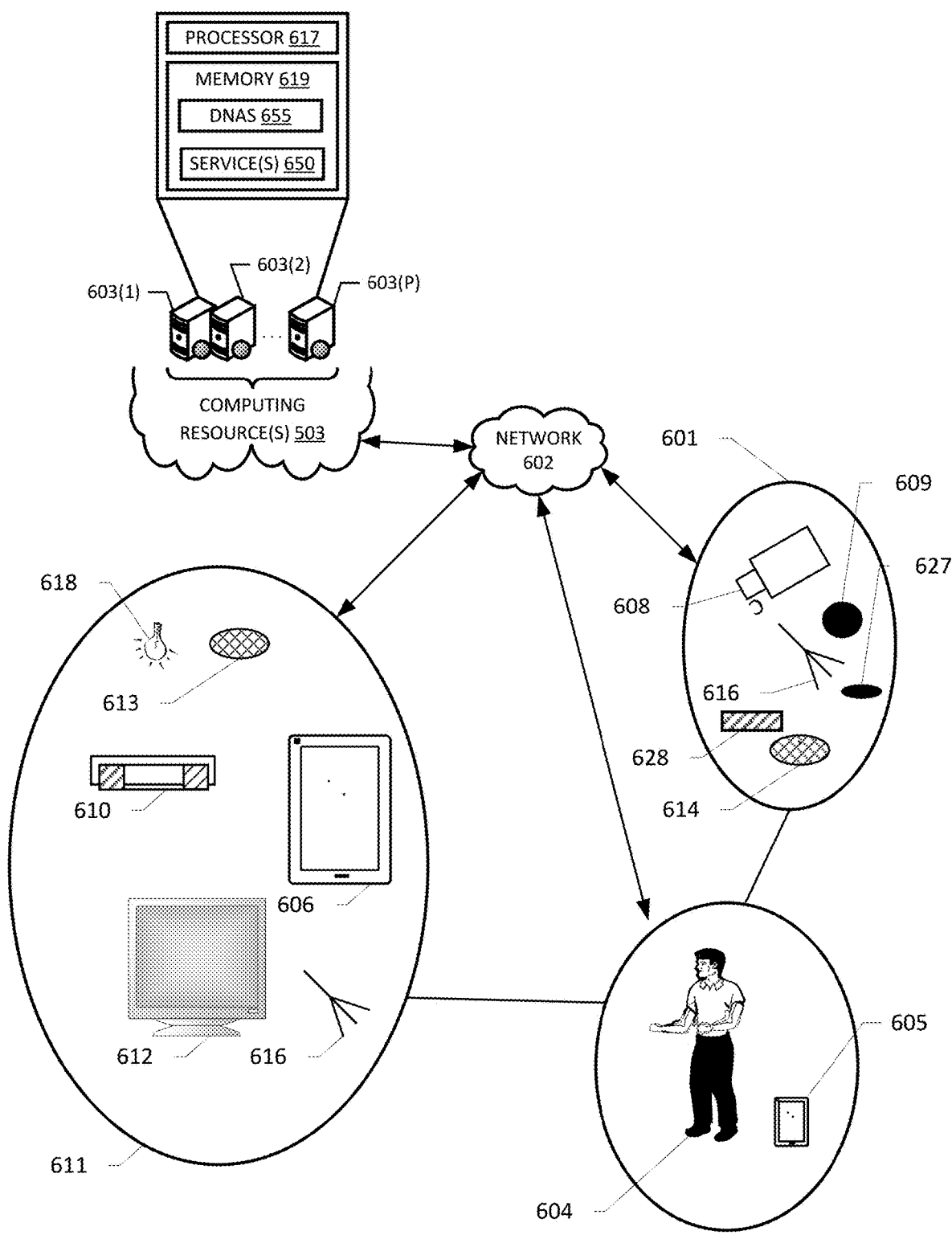
FIG. 6 shows components and communication paths between component types utilized in a materials handling facility of FIG. 4, in accordance with described implementations.

FIG. 6 shows example components and communication paths between component types utilized in a materials handling facility, in accordance with one implementation. A portable device 605 may communicate and interact with various components of services 650 and/or DNAS 655 over a variety of communication paths. Generally, the services 650 and/or DNAS 655 may include input components 601, output components 611 and computing resource(s) 603. The input components 601 may include an overhead imaging device 608, side-view imaging device 609, an in-shelf camera 627, a weight sensor 628, microphone 614, antenna 616, or any other component that is capable of receiving input about the surrounding environment and/or from the agent. The output components 611 may include a projector 610, a portable device 606, a display 612, an antenna 616, a radio (not shown), speakers 613, illumination elements 618 (e.g., lights), and/or any other component that is capable of providing output to the surrounding environment and/or the agent.

The services 650 and/or DNAS 655 may also operate on and/or include computing resource(s) 603. The computing resource(s) 603 may be local to the environment (e.g., materials handling facility), remote from the environment, or any combination thereof. Likewise, the computing resource(s) 603 may be configured to communicate over a network 602 with input components 601, output components 611 and/or directly with the portable device 605, and/or an agent 604.

As illustrated, the computing resource(s) 603 may be remote from the environment and implemented as one or more servers 603(1), 603(2), . . . , 603(P) and may, in some instances, form a portion of a network-accessible computing platform implemented as a computing infrastructure of processors, storage, software, data access, and so forth that is maintained and accessible by components/devices of the services 650 and/or DNAS 655 and/or the portable device 605 via a network 602, such as an intranet (e.g., local area network), the Internet, etc. The server system(s) 603 does not require end-agent knowledge of the physical location and configuration of the system that delivers the services. Common expressions associated for these remote computing resource(s) 603 include "on-demand computing," "software as a service (SaaS)," "platform computing," "network-accessible platform," "cloud services," "data centers," and so forth.

Each of the servers 603(1)-(P) include a processor 617 and memory 619, which may store or otherwise have access to services 650 and/or DNAS 655, which may include or provide image processing (e.g., for agent identification, item identification, etc.), inventory tracking, device state notifications, device set status notifications, location determination, etc.

The network 602 may utilize wired technologies (e.g., wires, USB, fiber optic cable, etc.), wireless technologies (e.g., radio frequency, infrared, NFC, cellular, satellite, Bluetooth, etc.), or other connection technologies. The network 602 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to agents of systems or facilities employing such sensors or computer systems. The data relating to agents may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Figure 7:
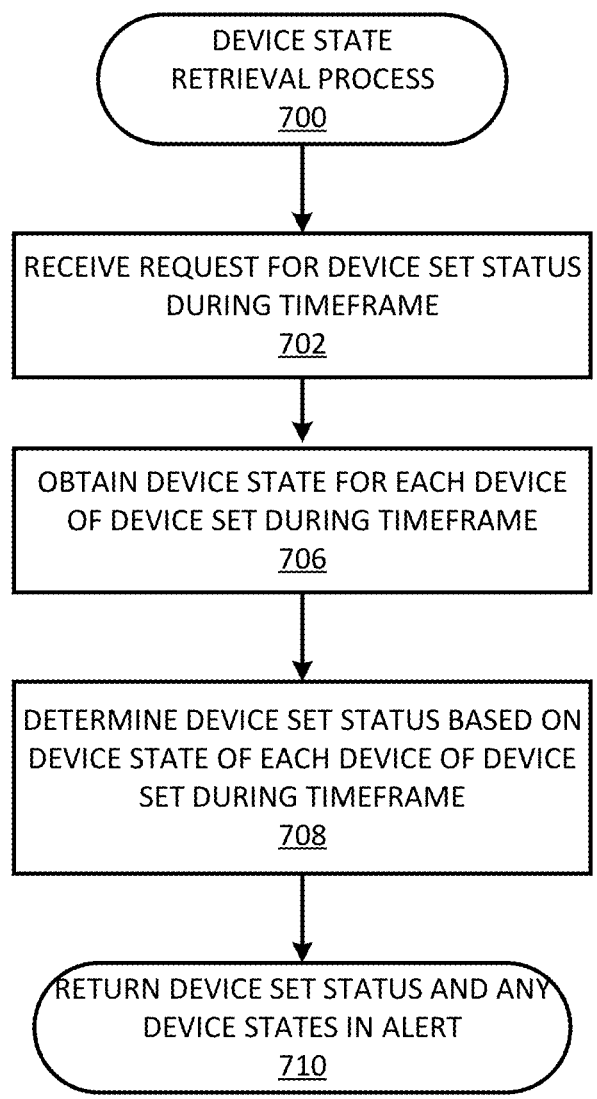
FIG. 7 is a flow diagram of an example device state retrieval process, in accordance with described implementations.

FIG. 7 is a flow diagram of an example device state retrieval process 700, in accordance with described implementations. The example process 700 begins upon receipt of a request from a service for a device set status and/or a device state for each device of a device set, as in 702. For example, if a service, such as the inventory management service, receives device data from a device, the service may determine the devices of a device set that includes the device from which device data was received and request device state information for those devices and/or device set status for the timeframe corresponding to a timeframe of the device data.

In some implementations, rather than the service determining the device set and device corresponding to a device from which it received device data, the service may send a request for just the device state of the single device. In such an implementation, the example process determines a device set in which the requested device is associated and that corresponds to the requesting service. As noted above, a device may be associated with multiple device sets that are used by various services. The data store may maintain a relationship between each device, device set, and service that uses each device set. Upon receiving a request for a device state from a service, the device set associated with that service and that includes that device may be determined from the stored information.

Regardless of whether the service devices the device set and the devices of the device set, or the example process determines the device set and/or devices of the device set, the example process 700 obtains device state information for each device of the device set for the requested timeframe, as in 706. For example, the data store may be queried for each device to obtain device state information for the device during the time frame. If a stored device state for a device does not exist within a timestamp during the timeframe, the last know state of the device may be utilized as the device state for that device during the timeframe. In another implementation, if a device state does not exist during the relevant timeframe and the device has not provided periodic device state information, it may be determined that the device is in an alarm state. In still other examples, if a device state with a timestamp for a device does not exist during the timeframe but a first device state with a timestamp prior to the timeframe and a second device state with a timestamp subsequent to the timeframe is stored for the device, the device state of the device as indicated by the second device state with the timestamp subsequent to the timeframe is utilized as the device state for the timeframe. If there is multiple device state information stored for a device with timestamps during the timeframe, each of those device states may be considered for the device.

Based on the device state of each device of the device set during the timeframe, a device set status for the device set is determined, as in 708. For example, if all of the devices have a device state of normal during the timeframe, the device set status for the requested timeframe will be set to white. If one of the devices is in an alarm state, the device state for the device set status may be set to grey. Finally, if a threshold number of devices of the device set are in an alarm state, the device set status will be set to a black state for the timeframe.

In some implementations, some devices of a device set may be assigned a higher priority than other devices of the device set. For example, if the device set is used by the inventory management service to determine a pick event or a place event and includes an in-shelf camera, a weight sensor, an overhead camera that is above the inventory area, and a camera that is on a shelf across the aisle, the in-shelf camera and the weight sensor may be higher priority devices than the overhead camera and the across-aisle camera. In such a configuration, if either the in-shelf camera or the weight sensor are in an alarm state, the device set status may be transitioned to grey. However, if both the in-shelf camera and the weight sensor are normal, the device state status will remain white. Finally, if both the in-shelf camera and the weight sensor are in an alarm state, the device set status may be transitioned to black unless both the overhead camera and the across-aisle camera have a normal state. In such an instance, the device set status may be set to grey.

Returning to FIG. 7, the device set status for the device set is returned to the service that requested the device state, as in 710. Likewise, if one or more devices are not in a normal status, the example process may also provide a device state for those devices. However, if all devices are operating normal, only the device set status of white may be returned to the service.

Figure 8:
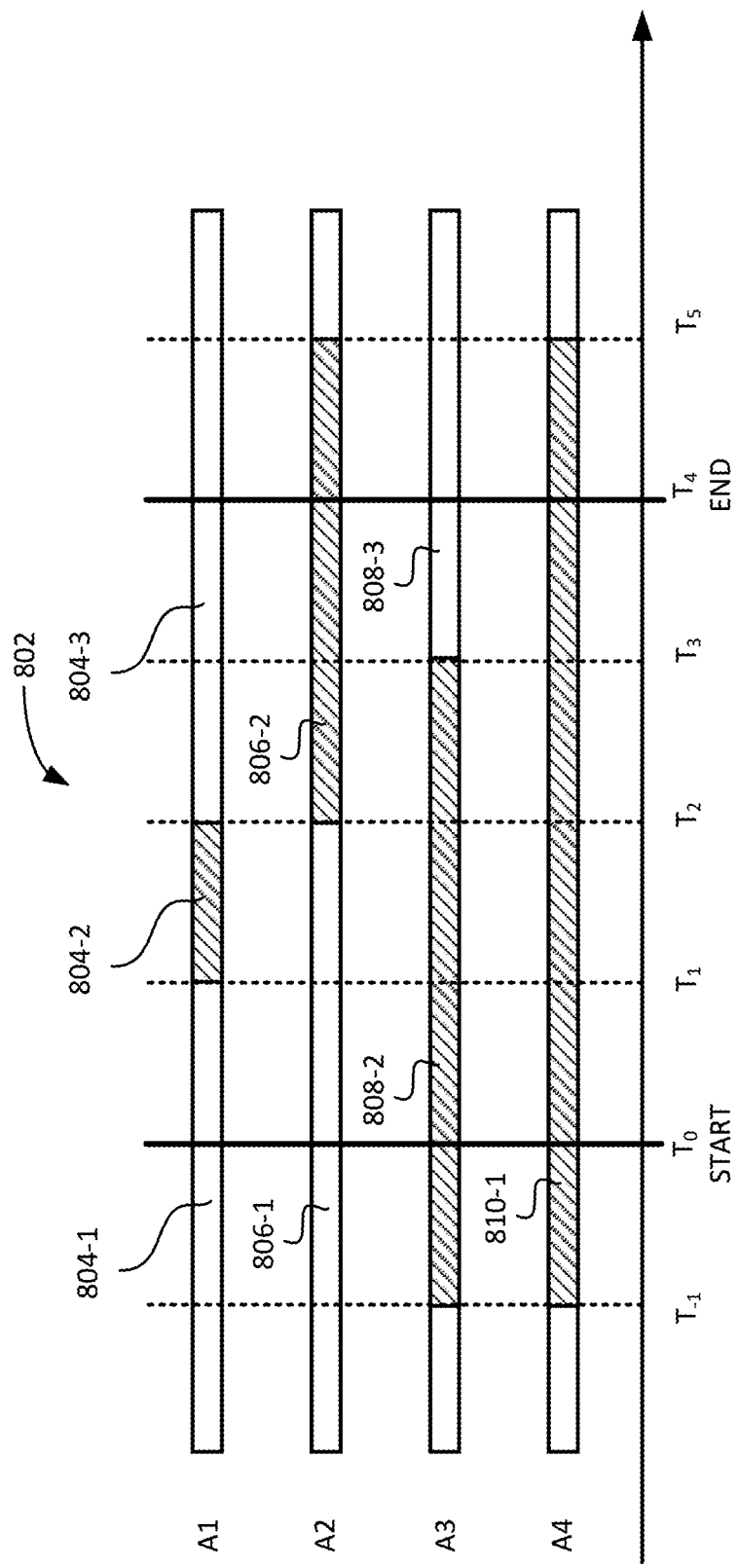
FIG. 8 is a block diagram illustrating different state transitions for a device during a timeframe, in accordance with described implementations.

FIG. 8 is a block diagram illustrating different state transitions for a device, in accordance with described implementations. In the illustrated example, in each of the transitions A1, A2, A3, and A4, an alarm state exists for the device during at least a portion of a timeframe 802 between a start time $T_0$ and an end time $T_4$. For ease of explanation, the device state will be discussed with respect to a device, such as a weight sensor, providing device data to a service such as the inventory management service during the timeframe 802.

In the first transition A1, the device begins providing device data to the service at the start time $T_0$ and during the timeframe until the end time $T_4$. The inventory management service requests from and the DNAS service provides to the inventory management service a device state for the device during the timeframe 802. In the first transition A1, the device is initially in a first sate as determined by first device state information having a time $T_0$. However, in this example, at time $T_1$ the device transitions to a second state 804-2, such as an alarm state, as indicated by device state information having a timestamp of $T_1$. At time $T_2$ the device transitions back to the normal state 804-3 and remains in the normal state until the end of the timeframe. Referring to the second transition A2, the device starts in a normal state 806-1 until it transitions to an alarm state 806-2 at time $T_2$ during the timeframe. In this example, the device remains in the second alarm state 806-2 until after the timeframe, e.g., until time $T_5$. As another example, the third transition A3 illustrates that the device is in alarm state when the timeframe begins, as illustrated by alarm state 808-2 but then, at time $T_3$, transitions to a normal state 808-3 before the end of the timeframe. In transition A4 the device begins the timeframe in the alarm state 810-1 and remains in the alarm state until a time $T_5$ that is after the end time $T_4$ of the timeframe 802.

In each instance, because the device is in an alarm state at some point during the timeframe, the DNAS will indicate to the service that the device is in an alarm state during the timeframe 802. In comparison, if the device does not transition to an alarm state during the timeframe 802, the DNAS will provide a device state of normal during the timeframe for the device.

In some examples, the device state during the timeframe may be obtained by making specific queries to the data store that maintains the device state information, rather than obtaining all device state information for the device during the timeframe. For example, all four device transitions discussed with respect to FIG. 8 may be determined with two queries. A first query may query the data store for any device state changes of the device from a normal state to an alarm state during the timeframe, regardless of the device state at the end of the timeframe. A second query of the data store may query for any device state in alarm at the start $T_O$ of the timeframe. Such a query will identify both the A3 and A4 transitions. In such an implementation, if either query returns an indication that a device is in an alarm state during the timeframe, the device state during the timeframe may be set to an alarm state. Likewise, the device set status for any device sets that include the device will be updated accordingly for the timeframe. In comparison, if the two queries do not return any state transitions, the device state for the device during the timeframe will be a normal state.

Figure 9:
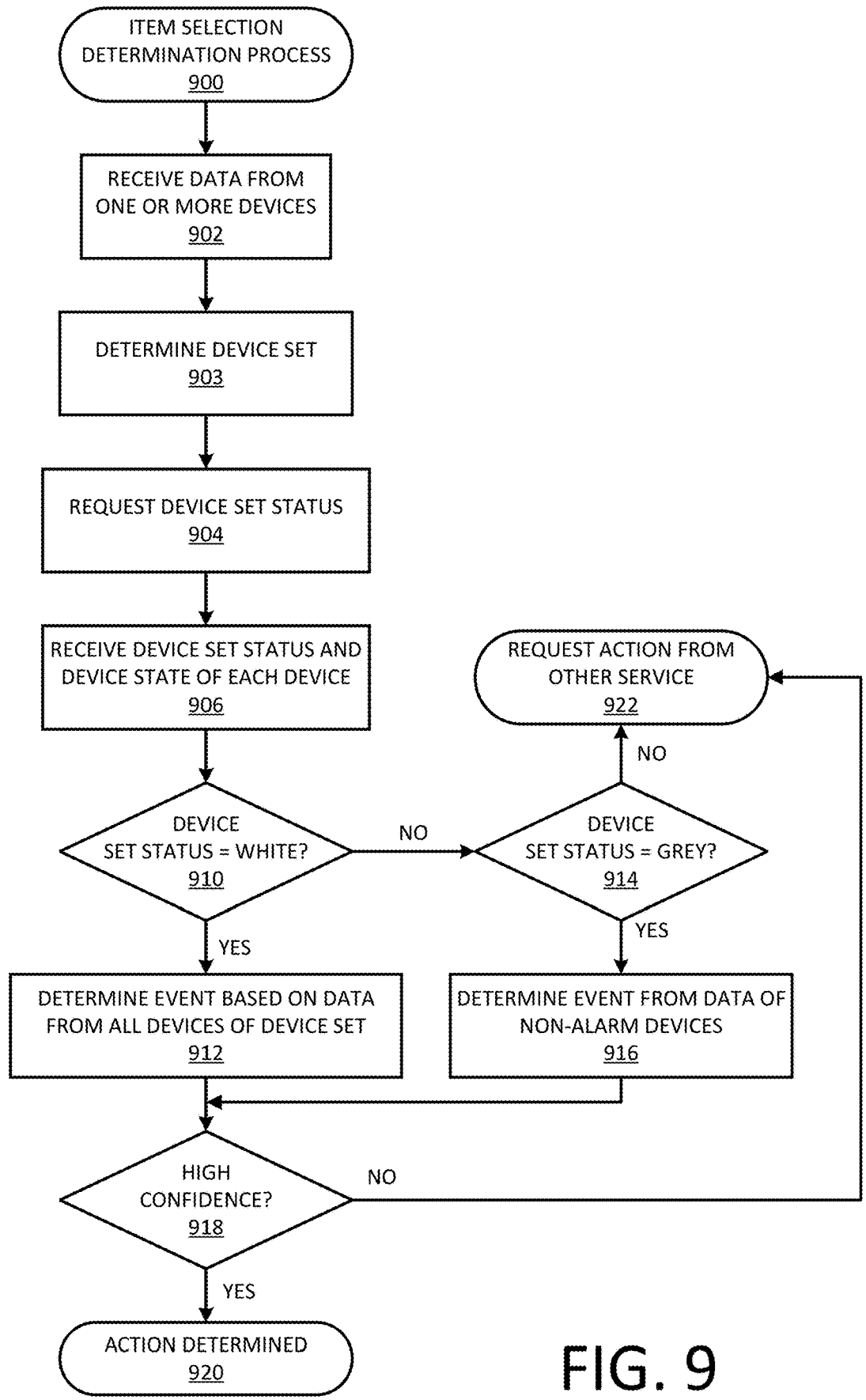
FIG. 9 is a flow diagram of an example event determination process, in accordance with described implementations.

FIG. 9 is a flow diagram of an example item selection determination process 900, in accordance with described implementations. FIG. 9 is provided as an example from the perspective of the inventory management service to provide an indication of the device state information and the device set status information that may be utilized by a service for event determination. As will be appreciated other services, such as agent monitoring, agent re-identification, item monitoring, etc., may likewise utilize device state information and/or device set status information.

The example process 900 begins upon receipt of device data from one or more devices of a device set, as in 902. For example, a first device, such as a weight sensor positioned on a first shelf of an inventory location, may detect a change in a weight measured by the device at a first time. Upon detecting the change in weight, the device data may be provided to the example process 900 along with a time at which the change in weight was detected by the first device.

Upon receipt of device data from one or more devices, a device set that includes one or more devices, including the one or more devices from which the data was received, is determined by the service, as in 903. For example, if the service is an inventory management service, and the service receives device data from a first weight sensor on a first shelf, the service may determine that the device set that includes the first weight sensor also includes an in-shelf camera of a second shelf that is adjacent and above the first shelf. Based on the determined device set, a device set status request for the device set is sent to the DNAS requesting a device state of the first device during a timeframe that includes the time corresponding to the device data received from the first device, as in 904. As discussed above, the DNAS, upon receiving a request for a device set status, determines and returns to the service, the device state of each device of the device set during the timeframe and also determines and returns, based on the device state of each device, a device set status for the timeframe. As part of the example process 900, the example process receives from the DNAS the device set status and the device state of each device during the timeframe, as in 906. In some implementations, rather than receiving the device state of each device, the DNAS may only return the device set status and the device state for devices in an alarm state, or the device state for devices not in an alarm state.

Upon receipt of the device set status and corresponding device states for devices of the device set, a determination is made as to whether the device set status is in a white state, as in 910. As discussed above, a white state for a device set status may indicate that all devices of the device set or at least all devices of the device set that are necessary for the service to determine the event, are in a normal state. If it is determined that the device set status is white, an event is determined based on the device data received from the devices of the device set during the timeframe, as in 912. For example, the inventory management service may consider data received from both the weight sensor and the in-shelf camera to make a high confidence determine of an item pick or an item place. For example, if the weight sensor indicates an increase in weight during the timeframe and the in-shelf camera indicates a visual change in the objects on the inventory shelf, the inventory management service can determine with a high level of confidence than an item place of an item to the inventory shelf has occurred. As another example, if the weight sensor indicates a decrease in weight during the timeframe and the in-shelf camera indicates a removal of an item from the inventory location, the inventory management service can determine with a high degree of confidence that an item pick of an item from the inventory shelf has occurred.

Returning to decision block 910, if it is determined that the device set status is not white, a determination is made as to whether the device set status is grey, as in 914. As discussed above, a device set status may be set to grey if one or more devices or one or more critical devices of the device set are in an alarm state during the timeframe. For example, if either the weight sensor or the in-shelf camera are in an alarm state during the timeframe in which the inventory management service is requesting device state information, the device set status may be set to grey.

If it is determined at decision blocks 910 and 914 that the device set status is not white or grey, meaning, in this example, that the device set status is black, the example process 900 requests action from another service, as in 922. Action from another service may be requested because if the device set status is black sufficient information may not be available to determine if an event occurred. The action from the other service may be, for example, a request to reset, repair, or replace the devices in the alarm state, a request as to whether another event was detected in the area during the timeframe, etc.

Returning to decision block 914, if it is determined that the device set status is grey, an event is determined based on device data received from each device of the device set during the timeframe that is not in an alarm state, as in 916. The service may determine the event by either not considering data from the device(s) in alarm state or by reducing the weight given to the data received from the device(s) in an alarm state. It may also be determined whether the detected event has a high confidence of accuracy or a low confidence of accuracy. For example, if the in-shelf camera is in an alarm state but the inventory management service receives device data from the weight sensor and the across-aisle camera that both indicate that an item pick occurred, the event may still be determined a high confidence event. In comparison, if the weight sensor indicates an item pick but the in-shelf camera is in an alarm state and the across-aisle camera was blocked by an agent and could not obtain an image of the shelf during the timeframe, the event determination of an item pick may be a low confidence determination because the event is based on only the change in weight detected by the weight sensor.

Upon determining the event at either block 912 or block 916, a determination is made as to whether the event was determined with high confidence that the event has been accurately detected or a low confidence, as in 918. If the event has been determined with a low confidence level, action from another service may be requested, as in 922. For example, the device data during the timeframe for the low confidence event may be sent to an agent with a request that the agent confirm the occurrence of the event. In comparison, if the event is determined with a high confidence, the event is considered determined, as in 920, without involvement from another service or agent.

Figure 10:
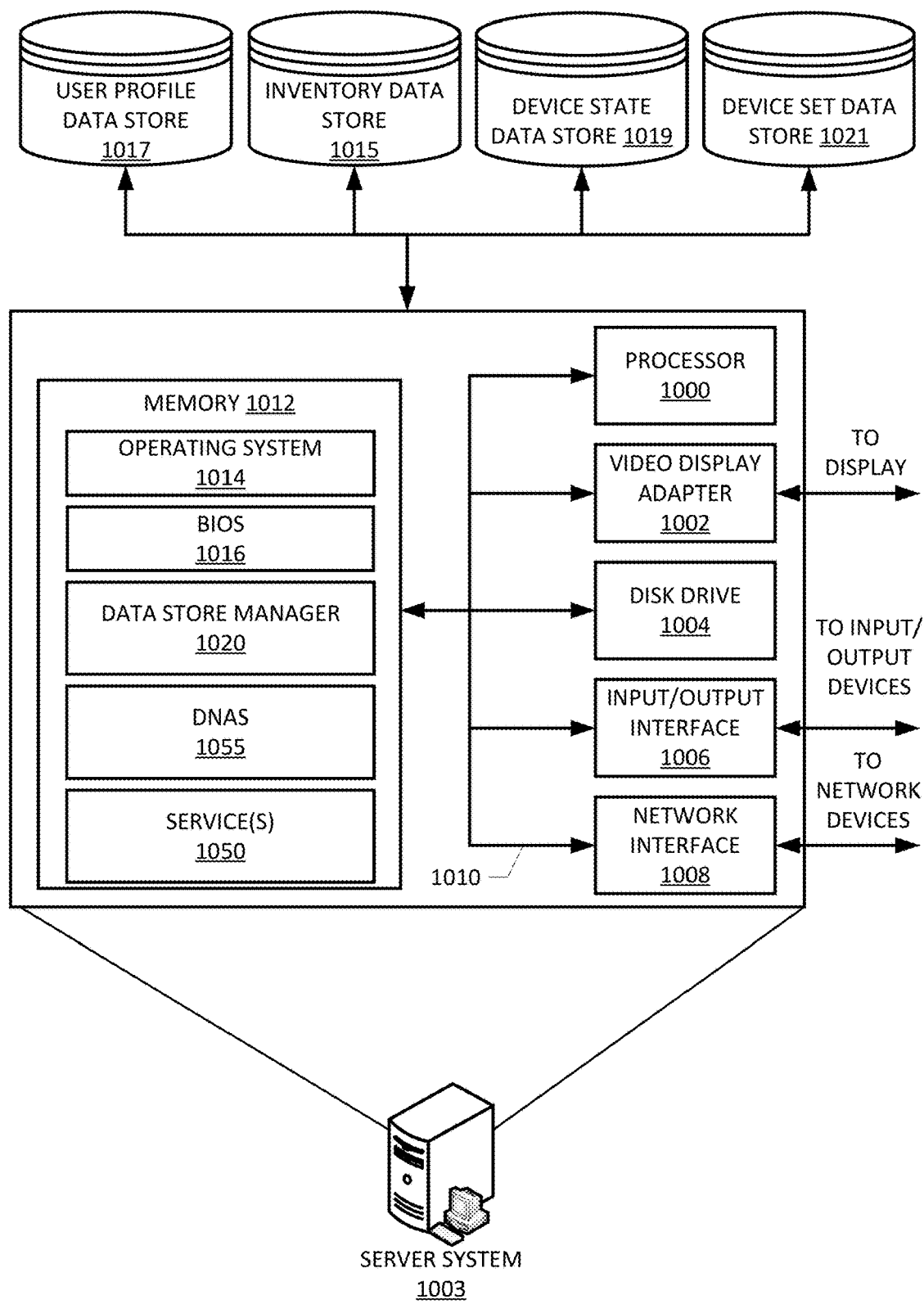
FIG. 10 is a block diagram of an illustrative implementation of a server system that may be used with various implementations.

FIG. 10 is a pictorial diagram of an illustrative implementation of a server system, such as the server system 1003, that may be used in the implementations described herein. The server system illustrated in FIG. 10, or another similar server system, may be configured as the DNAS and/or one or more of the services (e.g., inventory management service, agent pattern management service).

The server system 1003 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display permitting an operator of the server system 1003 to monitor and configure operation of the server system 1003. The input/output interface 1006 likewise communicates with external input/output devices, such as a mouse, keyboard, scanner, or other input and output devices that can be operated by an operator of the server system 1003. The network interface 1008 includes hardware, software, or any combination thereof, to communicate with other computing devices. For example, the network interface 1008 may be configured to provide communications between the server system 1003 and other computing devices via the network 602, as shown in FIG. 6.

The memory 1012 generally comprises random access memory (RAM), read-only memory (ROM), flash memory, and/or other volatile or permanent memory. The memory 1012 is shown storing an operating system 1014 for controlling the operation of the server system 1003. A binary input/output system (BIOS) 1016 for controlling the low-level operation of the server system 1003 is also stored in the memory 1012.

The memory 1012 additionally stores program code and data for providing network services. The data store manager application 1020 facilitates data exchange between the inventory table data store 1015, the agent profile data store 1017, the device state data store 1019, and/or the device set data store 1021.

As used herein, the term "data store" refers to any device or combination of devices capable of storing, accessing and retrieving data which may include any combination and number of data servers, databases, data storage devices and data storage media in any standard, distributed or clustered environment. The server system 1003 can include any appropriate hardware and software for integrating with the data stores 1015, 1017, 1019, 1021 as needed to execute aspects of the services 1050 and/or DNAS 1055.

The data stores 1015, 1017, 1019, 1021 can include several separate data tables, databases or other data storage mechanisms and media for storing data relating to a particular aspect. For example, the data stores 1015, 1017, 1019, 1021 illustrated include mechanisms for maintaining inventory information (e.g., item locations, images of item when properly positioned, depth map information for an item located on an inventory shelf, item features), agent profile information, agent pattern information, device state information, device set information, device set status information, etc.

It should be understood that there can be many other aspects that may be stored in the data stores 1015, 1017, 1019, 1021. The data stores 1015, 1017, 1019, 1021 are operable, through logic associated therewith, to receive instructions from the server system 1003 and obtain, update or otherwise process data in response thereto.

The memory 1012 may also include the DNAS 1055 and/or one or more services 1050, such as the inventory management service, as discussed above. The corresponding services 1050 and/or DNAS 1055 may be executable by the processor 1000 to implement one or more of the functions of the server system 1003. In one implementation, the corresponding services 1050 and/or DNAS 1055 may represent instructions embodied in one or more software programs stored in the memory 1012. In another implementation, the corresponding services 1050 and/or DNAS 1055 can represent hardware, software instructions, or a combination thereof.

It will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving from a camera oriented toward an inventory shelf a device state identifier and a timestamp, the device state identifier indicates that the camera is in a normal state and the timestamp indicates a time at which the normal state was determined for the camera, wherein the normal state indicates that the camera is operating as expected;
   determining, based at least in part on the device state identifier, that the camera has transitioned from an alarm state to the normal state, wherein the alarm state indicates that the camera is not operating as expected;
   determining a timeframe during which a device state of the camera is in the normal state;
   determining a device set associated with the camera, the device set including a plurality of devices, including the camera and a weight sensor configured to measure a change in a weight at the inventory shelf, each of the plurality of devices utilized to determine an event at the inventory shelf;
   determining a device state for each device of the device set during the timeframe;
   determining, based at least in part on the device state of the camera and the device state determined for each device of the device set, a device set status, wherein:
      a first device set status indicates that each of the plurality of devices of the device set are operating as expected and that device data received from the plurality of devices of the device set is reliable; and
      a second device set status indicates that at least a threshold number of the plurality of devices of the device set are not operating as expected and that device data received from the plurality of devices of the device set is unreliable; and
   sending to at least one service, an indication of the determined device set status.

2. The computer-implemented method of claim 1, further comprising:
   determining that the weight sensor is in the normal state; and
   determining, based at least in part on the camera having the normal device state and the weight sensor having the normal state, that the device set has the first device set status.

3. The computer-implemented method of claim 1, further comprising:
   comparing the device state identifier with a stored device state identifier associated with a second timestamp, the stored device state identifier indicates that the device is in the alarm state and the second timestamp indicates that the alarm state indicated by the stored device state identifier was determined at a time prior to the device state identifier; and
   wherein:
      determining that the camera has transitioned from the alarm state to the normal state is based at least in part on the determination that the camera has transitioned from the alarm state to the normal state; and
      determining the timeframe includes setting a start of the timeframe to correspond with the time indicated by the timestamp.

4. The computer-implemented method of claim 1, further comprising:
   determining that a period of time has elapsed without receipt of a second device state identifier from a second device of the plurality of devices; and
   determining, based at least in part on the period of time elapsing without receipt of the second device state identifier from the second device, that the second device is in an alarm state.

5. The computer-implemented method of claim 1, further comprising:
   subsequent to sending, to the at least one service, the indication of the determined device set status, determining a device state change for at least one device of the device set during the timeframe;
   in response to receiving determining the device state change, determining an updated device set status for the plurality of devices; and
   sending, to the at least one service, an updated device set status notification indicating the updated device set status.

6. A device state notification service, comprising:
   one or more processors;
   a memory coupled to the one or more processors and storing program instructions that when executed by the one or more processors cause the one or more processors to at least:
      receive a request for a device set status of a device set that includes a plurality of devices;
      for each of the plurality of devices:
         obtain from storage, a first device state indicator representative of a device state of the device, wherein the device state indicator indicates whether the device is operating as expected or not operating as expected;
      determine, based at least in part on the device state indicator obtained for each of the plurality of devices, a device set status, wherein:
         a device set status indicates that each of the plurality of devices of the device set are operating as expected and that device data received from the plurality of devices of the device set is reliable; and
         a second device set status indicates that at least a threshold number of the plurality of devices of the device set are not operating as expected and that device data received from the plurality of devices of the device set is unreliable; and
      send an indication of the determined device set status.

7. The device state notification service of claim 6, wherein the program instructions further cause the one or more processors to at least:

receive a timeframe corresponding to the request; and
wherein:
a first device state indicator of the plurality of device state indicators is representative of a first device state associated with the timeframe; and
a second device state indicator of the plurality of device state indicators is representative of a second device state associated with the timeframe.

8. The device state notification service of claim 6, wherein the program instructions further cause the one or more processors to at least:
send an alarm indication corresponding to a first device of the plurality of devices indicating that the first device has transitioned from a first state in which the first device is operating as expected to a second state in which the first device is not operating as expected.

9. The device state notification service of claim 8, wherein the alarm indication provides an indication that data from the first device is not reliable.

10. The device state notification service of claim 6, wherein:
a first device of the plurality of devices is a camera oriented to obtain images of an item positioned on an inventory shelf; and
a second device of the plurality of devices is a weight sensor coupled with the inventory shelf and configured to detect a change in a weight of items positioned on the inventory shelf.

11. The device state notification service of claim 6, wherein:
a third device set status indicates that at least one device of the plurality of devices is in a first alarm state.

12. The device state notification service of claim 6, wherein the program instructions further cause the one or more processors to at least:
receive, from a first device of the plurality of devices, a plurality of device state indicators, each device state indicator indicating a device state of the first device at a respective point in time.

13. The device state notification service of claim 6, wherein:
a first device state indicator obtained from storage indicates that a first device of the plurality of devices is in an alarm state, wherein the alarm state indicates that the first device is not operating as expected;
a second device state indicator obtained from storage indicates that a second device of the plurality of devices is in a normal state, wherein the normal state indicates that the second device is operating as expected; and
the program instructions further cause the one or more processors to at least:
determine, based at least in part on the alarm state of the first device, that data from at least one device of the device set is unreliable; and
send a third device set status indicating that data from at least one device of the device set is unreliable.

14. The device state notification service of claim 6, wherein:
the request for a device set status indicates a timeframe;
a first device state indicator obtained from storage for a first device of the plurality of devices is associated with a first timestamp representative of a first time that is within the timeframe; and
a second device state indicator obtained from storage for the first device of the plurality of devices is associated with a second timestamp representative of a second time that is within the timeframe.

15. A computer-implemented method, comprising:
receiving from a first device a first plurality of device state indicators, each of the first plurality of device state indicators indicating whether the first device is operating as expected or not operating as expected at respective points in time;
storing in a data store, each of the first plurality of device state indicators;
receiving from a second device a second plurality of device state indicators, each of the second plurality of device state indicators indicating whether the second device is operating as expected or not operating as expected at respective points in time;
storing in the data store, each of the second plurality of device state indicators;
receiving a request for a device set status of a device set that includes the first device and the second device;
determining, based at least in part on at least one of the first plurality of device state indicators and at least one of the second plurality of device state indicators, a device set status, wherein:
a first device set status indicates that each device of the device set is operating as expected and that device data received from each device of the device set is reliable; and
a second device set status indicates that at least a threshold number of devices of the device set are not operating as expected and that device data received from devices of the device set is unreliable; and
sending an indication of the determined device set status.

16. The computer-implemented method of claim 15, further comprising:
receiving a timeframe corresponding to the request;
obtaining from the data store, a first device state indicator of the first plurality of device state indicators corresponding to the timeframe;
obtaining from the data store, a second device state indicator of the second plurality of device state indicators corresponding to the timeframe; and
sending at least one of the first device state indicator or the second device state indicator.

17. The computer-implemented method of claim 16, wherein a state of the first device is at least one of a normal state indicating that the first device is operating as expected or an alarm state indicating that the first device is not operating as expected.

18. The computer-implemented method of claim 17, wherein:
determining the device set includes:
determining the first device set status if a first state of the first device is a first normal state and a second state of the second device is a second normal state, wherein the first normal state indicates that the first device is operating as expected and the second normal state indicates that the second device is operating as expected;
determining a third device set status if the first state of the first device is a first alarm state and the second state of the second device is the second normal state, wherein the first alarm state indicates that the first device is not operating as expected; and
determining the third device set status if the first state of the first device is the first normal state and the second state of the second device is a second alarm state, wherein the second alarm state indicates that the second device is not operating as expected.

* * * * *